(12) United States Patent
Monda et al.

(10) Patent No.: US 6,842,485 B2
(45) Date of Patent: Jan. 11, 2005

(54) METHOD AND APPARATUS FOR REPRODUCING COMPRESSIVELY CODED DATA

(75) Inventors: Ken Monda, Takatsuki (JP); Keiichi Miyazaki, Yokohama (JP); Akihiko Yamazaki, Sendai (JP); Hirotoshi Kobayashi, Sendai (JP)

(73) Assignee: Matsushita Electric Industrial Co., Ltd. (JP)

( * ) Notice: Subject to any disclaimer, the term of this patent is extended or adjusted under 35 U.S.C. 154(b) by 712 days.

(21) Appl. No.: 09/820,325

(22) Filed: Mar. 29, 2001

(65) Prior Publication Data

US 2001/0044711 A1 Nov. 22, 2001

(30) Foreign Application Priority Data

Mar. 29, 2000 (JP) ........................................ 2000-091986

(51) Int. Cl.⁷ ............................ H04N 7/12; H04N 11/02
(52) U.S. Cl. ............................... 375/240.25; 375/240.28
(58) Field of Search ...................... 375/240.01–240.06, 375/240.12–240.16, 240.23–240.26, 240.28

(56) References Cited

U.S. PATENT DOCUMENTS

| | | | |
|---|---|---|---|
| 5,535,008 A | | 7/1996 | Yamagishi et al. ......... 358/342 |
| 5,715,356 A | | 2/1998 | Hirayama et al. ............ 386/96 |
| 5,726,989 A | * | 3/1998 | Dokic ........................ 370/509 |
| 5,815,634 A | * | 9/1998 | Daum et al. .................. 386/96 |
| 5,959,684 A | | 9/1999 | Tan et al. |
| 6,088,063 A | * | 7/2000 | Shiba .......................... 348/515 |
| 6,236,432 B1 | * | 5/2001 | Lee ......................... 375/240.26 |
| 6,240,137 B1 | * | 5/2001 | Kato ....................... 375/240.26 |
| 6,246,720 B1 | * | 6/2001 | Kutner et al. .......... 375/240.25 |
| 6,587,635 B1 | * | 7/2003 | Subramanian et al. ........ 386/68 |

FOREIGN PATENT DOCUMENTS

EP          1021046 A1       7/2000

* cited by examiner

*Primary Examiner*—Chris Kelley
*Assistant Examiner*—Dave Czekaj
(74) *Attorney, Agent, or Firm*—Parkhurst & Wendel, L.L.P.

(57) ABSTRACT

A compressively coded data reproduction apparatus and method for separating compressively coded video, audio, and additional data, data from a stream, outputting these data performing head detection on video and audio frames; decoding the video frames to output video data; decoding the audio frames to output audio data; judging whether a detected head frame is a video frame or an audio frame corresponding to a designated entry point start time information being among the additional data of the detected frame, outputting a decoding request when the detected frame is judged as a video and/or audio frame corresponding to the start time, and outputting an output request at the point of time when both of the video frame and the audio frame have been decoded. The system can output a video frame and an audio frame at the same time, within a prediction of video frame unit or audio frame unit, when starting reproduction of compressively coded data from an entry point.

14 Claims, 6 Drawing Sheets

METHOD AND APPARATUS FOR REPRODUCING COMPRESSIVELY CODED DATA

FIELD OF THE INVENTION

The present invention relates to a method and an apparatus for reproducing compressively coded data and, more particularly, to a method and an apparatus for reproducing video frames and audio frames from an arbitrary reproduction start time in a data stream in which compressively coded data are multiplexed.

BACKGROUND OF THE INVENTION

With recent developments in multimedia technology, various devices for integrally handling multiple media such as digitized video, audio, and data, typified by a DVD player and a set top box for receiving digital TV broadcast, are becoming widespread.

Since the digitized video data or audio data have an enormous amount of codes, an efficient compressive coding technology for digital data is absolutely necessary for efficient recording and transmission. Further, in order to apply the compressive coding technology to practical devices, a multimedia data multiplexing technology for integrating the compressively coded video data, audio data, and additional information data into a single data stream is also required various kinds of technologies for efficient compressive coding and multimedia data multiplexing have already been put to practical use. For example, as an efficient compressive coding technology for audio data, the AC-3 method of Dolby Laboratories Licensing Corp. is widely used. On the other hand, as an efficient compressive coding technology for video data and a multimedia data multiplexing technology, the MPEG standardized by International Standards Organization (ISO) is widely used. These method and standard are also employed in the DVD standard and, especially, a program stream, that is one of multiplexing methods defined by the MPEG standard, is employed as a data stream.

The DVD-Video Recording, which is one of the DVD standards and has most recently been standardized, defines editing of a program stream by an end user using a DVD-RAM disk or the like, and provides a new tool called an entry point. The entry point is defined by time. By defining an entry point, the user can start data reproduction from an arbitrary point (time). Therefore, the entry point can be interpreted as a reproduction start time. Hereinafter, a description will be given of a method for reproducing compressively coded data, when the reproduction is started from an entry point.

First of all, a data structure of a program stream defined by the MPEG standard will be described with reference to FIG. 4.

Figure 4:
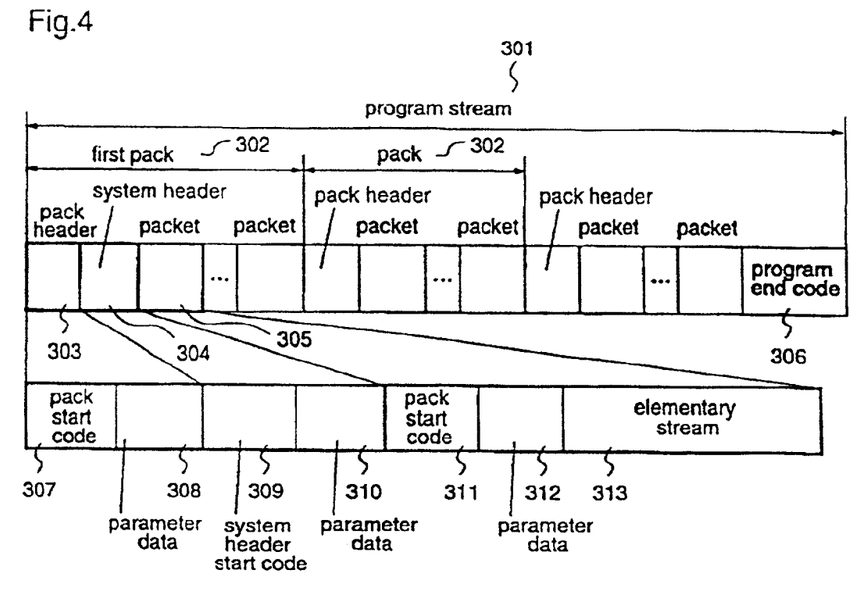
FIG. 4 is a diagram for explaining a data format of a program stream based on MPEG standard.

In FIG. 4, a program stream 301 is composed of a series of packs 302, and each pack 302 is composed of a pack header 303, a system header 304, and at least one packet 305.

The pack header 303 starts with a pack start code 307 (0x000001BA, where 0x indicates hexadecimal notation), and parameter data 308 of the pack, such as a reference clock value called SCR (System Clock Reference) and the like, are described just after the pack start code 307.

The system header 304 starts with a system header start code 309 (0x000001BB), and parameter data 310 of the entire program stream, such as the bit rate, the number of audio channels, the number of video channels, and the like, are described just after the system header start code 309.

The packet 305 starts with a packet start code 311, and parameter data 312 of the packet, such as a reproduction time called PTS (Presentation Time Stamp) and the like, are described just after the packet start code 311, and compressively coded data of video or audio, called an elementary stream 313, is described just after the parameter data 312. The parameter data 312 is information to be used when the elementary stream 313 is decoded.

The packet start code 311 is composed of a packet start prefix of three bytes (0x000001) and a stream ID of one byte. The stream ID denotes the type of the compressively coded data included in the packet. For example, 0xEx (the last x indicates an arbitrary value) denotes a video packet, and 0xDx denotes an audio packet.

Next, a data structure of a video elementary stream 401 compressively coded according to the MPEG standard, which is one of the compressively coded data described in the above-mentioned packets, will be described with reference to FIG. 5.

Figure 5:
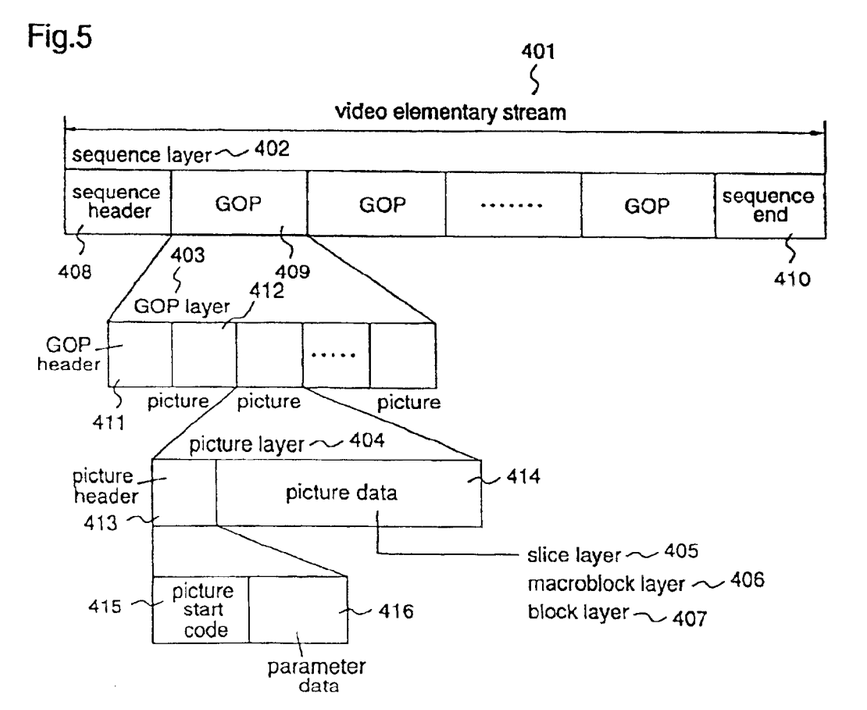
FIG. 5 is a diagram for explaining a data structure of a video elementary stream included in the program stream based on MPEG standard.

As shown in FIG. 5, the video elementary stream 401 has a hierarchical structure comprising six layers as follows: a sequence layer 402, a group of picture (hereinafter referred to as GOP) layer 403, a picture layer 404, a slice layer 405, a macroblock layer 406, and a block layer 407.

One sequence starts with a sequence header 408, followed by a series of GOPs 409, and ends with a sequence end 410. The sequence header 408 may be placed, not only at the head of the sequence, but also in an arbitrary position between adjacent GOPs as necessary.

The GOP 409 starts with a GOP header 411, and at least one picture 412 is described after the GOP header 411. The picture 412 is one piece of video frame to be displayed on the screen, and there are three kinds of pictures, I picture, P picture, and B picture. The I picture is short for an intra-frame coded picture that is obtained by compressive coding using only data of its own video frame. The P picture is short for a forward predictive coded picture that is obtained by compressive coding with reference to a video frame (I picture or P picture) in the past. The B picture is short for a bi-directional predictive coded picture that is obtained by compressive coding with reference to two video frames (I picture or P picture), one in the past and one in the future. It is defined that, in order to keep the independence of the GOP 409, the picture 412 just after the GOP header 411 must be an I picture.

Each of the sequence header 408 and the GOP header 411 starts with a start code and, as described above, each start code starts with a start code prefix "0x000001" (first three bytes), followed by the type of data (last one byte). The start code of the sequence header 408 is called a sequence start code (0x000001B3), and the start code of the GOP header 411 is called a group start code (0x000001B8).

The picture 412 starts with a picture header 413, followed by a slice layer 405, a macroblock layer 406, and a block layer 407. The picture header 413 starts with a picture start code 415 (0x00000100, where 0x indicates hexadecimal notation), and the picture start code 415 is followed by parameter data 416 of the picture, such as a number according to the display order of the picture, that is called a temporal reference, and the like. One slice is composed of a series of macroblocks starting from the upper left corner of the video frame, and one macroblock is composed of six blocks that are a fundamental processing unit.

Figure 6:
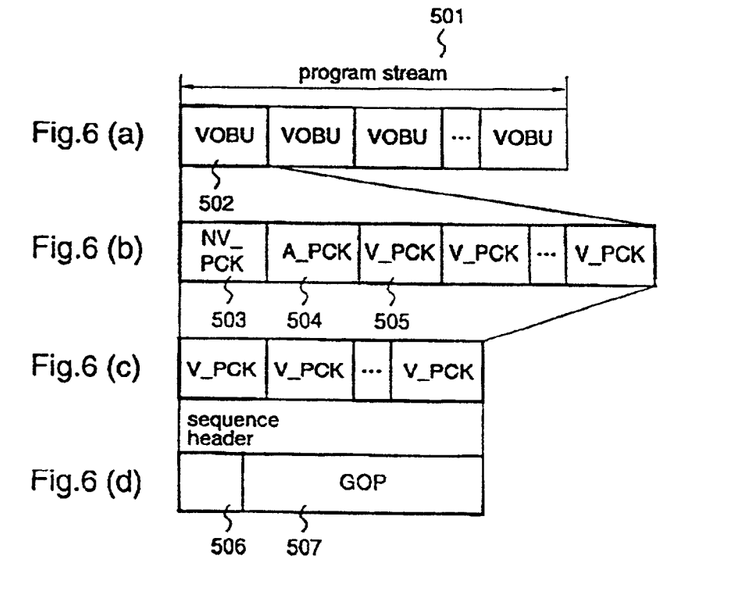
FIGS. 6(a)–6(d) are diagrams for explaining a data structure of a VOBU defined by DVD-Video standard.

By the way, in the DVD-Video Recording standard, as shown in FIG. 6(b), there is newly introduced a logical unit, that is, a VOBU 502 comprising a series of packs 503, 504, 505, . . . of video, audio, and the like. One VOBU 502 is defined as a minimum unit that assures synchronous reproduction of video and audio within a period of 0.4~1.0 sec. With reference to FIG. 6(d), the compressively coded video data in the VOBU 502 starts with a sequence header 506, and at least one GOP 507 is described after the sequence header 506. In some instances, a sequence end is described at the end of the VOBU 502. In the sequence header 506, parameter data common through the entire program, such as the video frame size, the aspect ratio, the frame rate, etc., are described.

Figure 7:
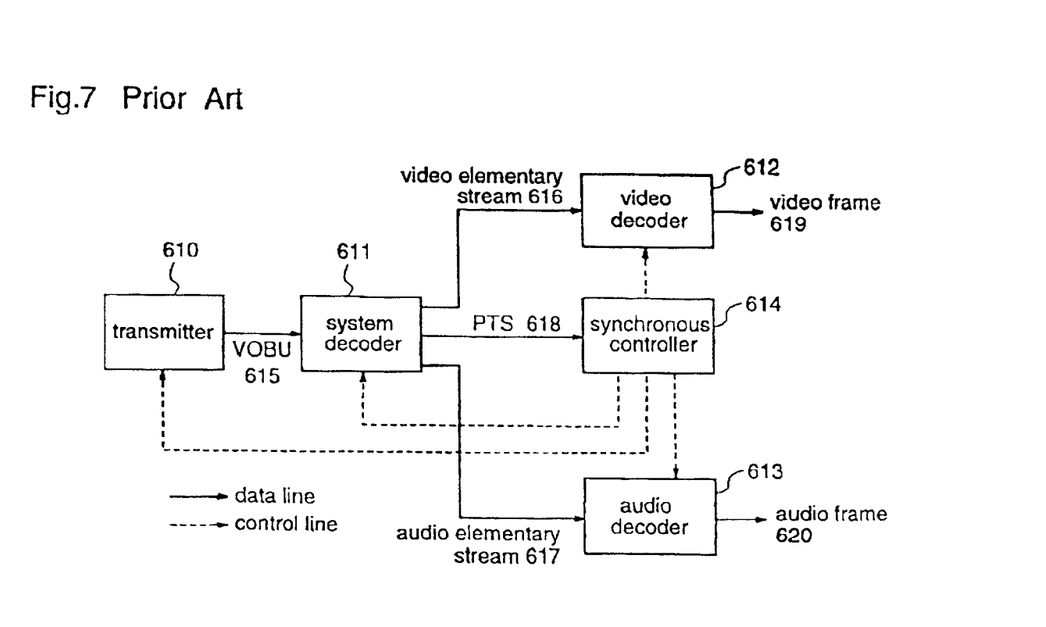
FIG. 7 is a block diagram illustrating the construction of a conventional compressively coded data reproduction apparatus.

Next, a description will be given of a method for reproducing compressively coded data, starting from the entry point described above. FIG. 7 is a block diagram illustrating the construction of a conventional apparatus for reproducing compressively coded data. With reference to FIG. 7, the apparatus is provided with a transmitter 610 for transmitting a stream; a system decoder 611 for extracting a required pack from the inputted stream; a video decoder 612 for decoding video data; an audio decoder 613 for decoding audio data; and a synchronous controller 614 for controlling the operation timings of the respective constituents of the apparatus. Hereinafter, a description will be given of the operation of the compressively coded data reproduction apparatus so constructed, when it starts data reproduction from an entry point.

As shown in FIG. 7, a VOBU 615 including an entry point is transmitted from the transmitter 610 to the system decoder 611. The system decoder 611 extracts a video pack and an audio pack from the inputted VOBU 615, and transmits a video elementary stream 616 and an audio elementary stream 617, which are obtained by removing packet start codes and parameter data from the video pack and the audio pack, to the video decoder 612 and the audio decoder 613, respectively. Further, the system decoder 611 transmits a PTS 618 included in the parameter data, to the synchronous controller 614. The video decoder 612 decodes video frames from the inputted video elementary stream 616. The audio decoder 613 decodes audio frames from the inputted audio elementary stream 617. The synchronous controller 614 controls the transmitter 610, the system decoder 611, the video decoder 612, and the audio decoder 613, thereby controlling synchronous output of a video frame 619 and an audio frame 620.

Figure 8:
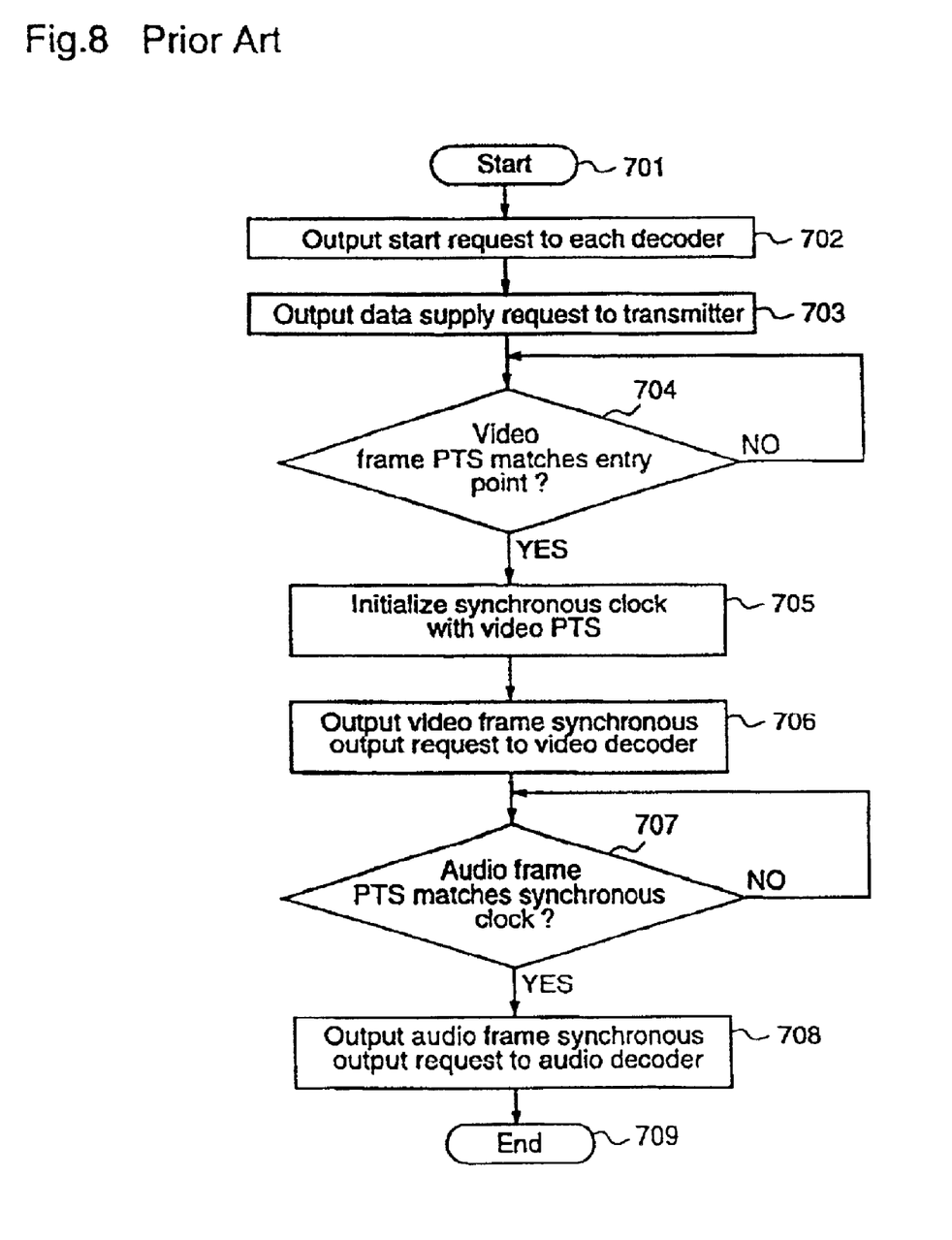
FIG. 8 is a flowchart for explaining the operation of a synchronous controller as one of constituents of the conventional compressively coded data reproduction apparatus.

FIG. 8 is a flowchart for explaining the operation to start data reproduction according to the entry point, of the synchronous controller 614 as one of the constituents of the conventional compressively coded data reproduction apparatus. Hereinafter, the operation of the synchronous controller 614 will be described in detail with reference to the flowchart of FIG. 8.

Initially, when the operation is started (step 701), the synchronous controller 614 is notified, from the outside, that an entry point value is set and data reproduction is to be started from the entry point, and outputs a start request to the transmitter 610 and the respective decoders 611, 612, and 613 (step 702). On receipt of this request, the transmitter 610 and the respective decoders 611, 612, and 613 start to operate.

Next, in step 703, the synchronous controller 614 outputs a data supply request to the transmitter 610. On receipt of this request, the transmitter 610 performs data transmission, starting from the head of the VOBU 615 including the entry point. On receipt of the data from the transmitter 610, the system decoder 611 starts the above-described separation and extraction.

In step 704, the video decoder 612 performs decoding of video frames from the video elementary stream supplied from the system decoder 611, until the video frame PTS 618 supplied from the system decoder 611 matches the entry point within a predetermined threshold. In this step, the video decoder 612 performs only decoding, and stores the decoded video frames in a video frame buffer (not shown) in the video decoder 612. That is, the video decoder 612 does not output video data for display yet.

The audio decoder 613 does not perform decoding until it receives an audio frame synchronous output request in step 708. The audio decoder 613 performs only storage of the audio elementary stream 617 supplied from the system decoder 611 in an audio bit buffer (not shown) in the audio decoder 613. In this storage process, the audio decoder 613 also controls overflow of the audio bit buffer. To be specific, when overflow is likely to occur, the audio decoder 613 discards the audio elementary stream 617 already stored in the audio bit buffer, and stores the audio elementary stream 617 that is newly transmitted in the audio bit buffer.

Next, in step 704, when the video frame PTS 618 supplied from the system decoder 611 matches the entry point within a predetermined threshold, the synchronous controller 614 goes to step 705. In step 705, the synchronous controller 614 initializes the synchronous clock with the value of the video frame PTS 618.

Next, in step 706, the synchronous controller 614 outputs a video frame synchronous output request to the video decoder 612. On receipt of this request, the video decoder 612 performs decoding of the video frame whose PTS 618 supplied from the system decoder 611 matches the entry point within the predetermined threshold and, simultaneously, outputs the video frame for display. In this step, output of a video frame for display is performed for the first time and, thereafter, the video decoder 612 performs decoding and output for display, on the subsequent video frames from the video elementary stream supplied from the system decoder 611, under synchronous control by the synchronous controller 614 using the synchronous clock and the video frame PTS 618 supplied from the system decoder 611.

Next, in step 707, the synchronous controller 614 continues monitoring until the audio frame PTS 618 supplied from the system decoder 611 matches the synchronous clock within a predetermined threshold. During the monitoring, the audio decoder 613 continues only the storage of the audio elementary stream 617 in the audio bit buffer.

When the audio frame PTS 618 supplied from the system decoder 611 matches the synchronous clock within the predetermined threshold in step 707, the synchronous controller 614 proceeds to step 708, and outputs an audio frame synchronous output request to the audio decoder 613.

On receipt of this request, the audio decoder 613 performs decoding of the audio frame whose PTS 618 supplied from the system decoder 611 matches the synchronous clock within the predetermined threshold and, simultaneously, performs audio output. In this step, output of an audio frame is performed for the first time and, thereafter, the audio decoder 613 performs decoding and audio output on the subsequent audio frames from the audio elementary stream supplied from the system decoder 611, under synchronous control by the synchronous controller 614 using the synchronous clock and the audio frame PTS 618 supplied from the system decoder 611.

In the conventional method for reproducing compressively coded data, however, since the output of audio frames is started in step 708 after the output of video frames for display is started in step 706, it is apparent that the output of audio frames lags behind the output of video frames for display.

Further, in the above-described method, when no coded video data exists in the program stream, there will not occur matching of condition that, in step 704, the video frame PTS 618 supplied from the system decoder 611 matches the entry point within the predetermined threshold, and therefore, the synchronous controller 614 cannot proceed to the following step 705 and on. In this case, even when a coded audio frame corresponding to the entry point exists in the data stream, the audio decoder 613 cannot start output of audio frames.

Furthermore, in the above-described method, when the video frame PTS 618 is not assigned to each video frame in the program stream, in order to make a matching of condition that the video frame PTS 618 supplied from the system decoder 611 matches the entry point within the predetermined threshold, the threshold should be sufficiently large. To be specific, although it is defined in the DVD-Video Recording standard that a video frame PTS should be assigned to each I picture, there is no such definition for other pictures. Further, there is no special definition on I pictures except that an I picture should be placed at the head of a VOBU. However, in many instances, an I picture exists only at the head of a VOBU in an actual program stream, with regard to the efficiency of compressive coding, and a video frame PTS is assigned to only the I picture at the head of the VOBU. Taking it in consideration, a threshold equivalent to one VOBU must be set, whereby the unit of synchronous control becomes, not a video frame, but a VOBU.

SUMMARY OF THE INVENTION

The present invention is made to solve the above-described problems and has for its object to provide a method and an apparatus for reproducing compressively coded data, by which output of a video frame for display and output of an audio frame can be performed at the same timing, at precision of video frame unit and audio frame unit, when starting reproduction of compressively coded data from an entry point.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a compressively coded data reproduction method for starting transmission of reproduced data from a video frame and an audio frame corresponding to a reproduction start time specified from the outside, on a data stream in which the following data are multiplexed: compressively coded video data comprising I pictures obtained by subjecting a series of video frames to intra-frame compressive coding, P pictures each obtained by forward-direction predictive compressive coding utilizing the correlation with a video frame in the past, and B pictures each obtained by bi-directional predictive compressive coding utilizing the correlation with two video frames in the past or in the future, or two video frames one in the past and one in the future; compressively coded audio data obtained by subjected a series of audio frames to compressive coding; and additional data relating to the compressively coded video data and the compressively coded audio data, and this method comprises the steps of: separating the compressively coded video data, the compressively coded audio data, and the additional data from the data stream and outputting these data and, at this time, performing head detection on the video frames and the audio frames; judging whether a detected head frame is a video frame or an audio frame corresponding to the reproduction start time, on the basis of reproduction time information that is one of the additional data assigned to the detected frame; making a decoding request for decoding the detected video frame from the compressively coded video data when the detected video frame is judged as a video frame corresponding to the reproduction start time, and making a decoding request for decoding the detected audio frame from the compressively coded audio data when the detected audio frame is judged as an audio frame corresponding to the reproduction start time; judging whether both of the video frame and the audio frame have been decoded or not; and requesting synchronous output of the decoded video data and audio data when it is judged that both of the video frame and the audio frame have been decoded. Therefore, it is possible to detect a video frame and an audio frame corresponding to the specified reproduction start time, decode these frames, and output the decoded video and audio frames at the same timing. Accordingly, when this method is applied to a stream editor required to have a high precision for commercial use or the like, the user can perform editing without a time lag between a picture and the corresponding audio.

According to a second aspect of the present invention, the compressively coded data reproduction method of the first aspect further comprises a step of judging whether a predetermined period of time has passed or not, before the step of judging whether both of the video frame and the audio frame have been decoded or not; and when the predetermined period of time has passed, an output request is made for either the video frame or the audio frame, whichever has been decoded. Therefore, even when only either of the video frame and the audio frame corresponding to the reproduction start time exists in the inputted data stream, reproduction can be normally started from the specified reproduction start time.

According to a third aspect of the present invention, the compressively coded data reproduction method of the first aspect further comprises the steps of: judging whether a predetermined period of time has passed or not, before the step of judging whether both of the video frame and the audio frame have been decoded or not; and notifying the outside that an abnormal condition occurs, when the predetermined period of time has passed and then both of the video frame and the audio frame have not yet been decoded. Therefore, even when both of the video frame and the audio frame corresponding to the reproduction start time do not exist in the inputted data stream, the reproduction start process from the specified reproduction start time can be ended without standstill.

According to a fourth aspect of the present invention, in the compressively coded data reproduction method of the first aspect, the data stream is a program stream defined by the MPEG standard, and the reproduction time information is a PTS (Presentation Time Stamp) defined by the MPEG standard. Therefore, it is possible to detect a video frame and an audio frame corresponding to the specified reproduction start time, decode these frames, and output the decoded video and audio frames at the same timing.

According to a fifth aspect of the present invention, in the compressively coded data reproduction method of the first aspect, the step of performing head detection on the video frames and the audio frames includes the steps of: judging whether an effective reproduction time information is assigned to the detected head frame or not; and, in the case where no effective reproduction time information is assigned to the detected frame, when the detected frame is a video frame, calculating reproduction time information of the video frame on the basis of display output order information that is one of the additional data of the video frame, and reproduction time information and display output order information of a video frame which has been decoded prior to the video frame; on the other hand, when the detected frame is an audio frame, calculating reproduction time information of the audio frame on the basis of reproduction time information of an audio frame which has been detected prior to the audio frame. Therefore, it is possible to detect a video frame and an audio frame corresponding to the specified reproduction start time, decode these frames, and output the decoded video and audio frames at the same timing, with a precision of a video frame unit or an audio frame unit.

According to a sixth aspect of the present invention, in the compressively coded data reproduction method of the fifth aspect, the display output order information is a temporal reference defined by the MPEG standard. Therefore, it is possible to detect a video frame and an audio frame corresponding to the specified reproduction start time, decode these frames, and output the decoded video and audio frames at the same timing, with a precision of a video frame unit or an audio frame unit.

According to a seventh aspect of the present invention, there is provided a compressively coded data reproduction apparatus for starting transmission of reproduced data from a video frame and an audio frame corresponding to a reproduction start time specified from the outside, on a data stream in which the following data are multiplexed: compressively coded video data comprising I pictures obtained by subjecting a series of video frames to intra-frame compressive coding, P pictures each obtained by forward-direction predictive compressive coding utilizing the correlation with a video frame in the past, and B pictures each obtained by bi-directional predictive compressive coding utilizing the correlation with two video frames in the past or in the future or two video frames, one in the past and one in the future; compressively coded audio data obtained by subjected a series of audio frames to compressive coding; and additional data relating to the compressively coded video data and the compressively coded audio data, and this apparatus comprises: a system decoder for separating the compressively coded video data, the compressively coded audio data, and the additional data from the data stream and outputting these data and, at this time, performing head detection on the video frames and the audio frames; a video decoder for decoding the video frames from the compressively coded video data to output video data; an audio decoder for decoding the audio frames from the compressively coded audio data to output audio data; and a synchronous controller for judging whether a head frame detected by the system decoder is a video frame or an audio frame corresponding to the reproduction start time, on the basis of reproduction time information that is one of the additional data assigned to the detected frame; outputting a decoding request to the video decoder when the detected frame is judged as a video frame corresponding to the reproduction start time; outputting a decoding request to the audio decoder when the detected frame is judged as an audio frame corresponding to the reproduction start time; and outputting an output request to the video decoder and to the audio decoder at the point of time when both of the video frame and the audio frame have been decoded. Therefore, it is possible to detect a video frame and an audio frame corresponding to the specified reproduction start time, decode these frames, and output the decoded video and audio frames at the same timing. Accordingly, when this apparatus is applied to a stream editor required to have a high precision for commercial use or the like, the user can perform editing without a time lag between a picture and the corresponding audio.

According to an eighth aspect of the present invention, in the compressively coded data reproduction apparatus of the seventh aspect, when only either of the video frame and the audio frame has been decoded after the expiration of a predetermined period of time, the synchronous controller outputs an output request to either of the video decoder and the audio decoder, whichever has completed decoding at this point of time. Therefore, even when only either of the video frame and the audio frame corresponding to the reproduction start time exists in the inputted data stream, reproduction can be normally started from the specified reproduction start time.

According to a ninth aspect of the present invention, in the compressively coded data reproduction apparatus of the seventh aspect, when both of the video frame and the audio frame have not yet been decoded after the expiration of a predetermined period of time, the synchronous controller notifies the outside that an abnormal condition occurs. Therefore, even when both of the video frame and the audio frame corresponding to the reproduction start time do not exist in the inputted data stream, the reproduction start process from the specified reproduction start time can be ended without standstill.

According to a tenth aspect of the present invention, in the compressively coded data reproduction apparatus of the seventh aspect, the data stream is a program stream defined by the MPEG standard, and the reproduction time information is a PTS (Presentation Time Stamp) defined by the MPEG standard. Therefore, it is possible to detect a video frame and an audio frame corresponding to the specified reproduction start time, decode these frames, and output the decoded video and audio frames at the same timing.

According to an eleventh aspect of the present invention, in the compressively coded data reproduction apparatus of the seventh aspect, in the case where an effective reproduction time information is not assigned to the head frame detected by the system decoder, when the detected head frame is a video frame, the synchronous controller calculates reproduction time information of the video frame on the basis of display output order information that is one of the additional data of the video frame, and reproduction time information and display output order information of a video frame which has been decoded prior to the video frame; and in the above-mentioned case, when the detected head frame is an audio frame, the synchronous controller calculates reproduction time information of the audio frame, on the basis of reproduction time information of an audio frame which has been detected prior to the audio frame. Therefore, it is possible to detect a video frame and an audio frame corresponding to the specified reproduction start time, decode these frames, and output the decoded video and audio frames at the same timing, with a precision of a video frame unit or an audio frame unit.

According to a twelfth aspect of the present invention, in the compressively coded data reproduction apparatus of the eleventh aspect, the display output order information is a temporal reference defined by the MPEG standard. Therefore, it is possible to detect a video frame and an audio frame corresponding to the specified reproduction start time, decode these frames, and output the decoded video and audio frames at the same timing, with a precision of a video frame unit or an audio frame unit.

According to a thirteenth aspect of the present invention, there is provided a compressively coded data reproduction method for starting transmission of reproduced data from a picture and an audio frame corresponding to a reproduction start time specified from the outside, on a data stream in which coded video data arranged in non-chronological order, coded audio data relating to the coded video data, and additional data attendant on these data are multiplexed, and this method comprises the steps of: separating the coded video data, the coded audio data, and the additional data from the data stream and outputting these data and, at this time, performing head detection on reproduced pictures and reproduced audio data; judging whether the detected head picture per screen or head audio data is a picture per screen or audio data corresponding to the reproduction start time specified from the outside, on the basis of reproduction time information that is one of the additional data assigned to the detected picture or audio data; making a decoding request for decoding the picture per screen and the audio data corresponding to the reproduction start time; judging whether both of the picture per screen and the audio data have been decoded or not; and making a request for synchronous output of the decoded picture per screen and the decoded audio data, when both of the picture and the audio data have already been decoded. Therefore, it is possible to detect a video frame and an audio frame corresponding to the specified reproduction start time, decode these frames, and output the decoded video and audio frames at the same timing. Accordingly, when this method is applied to a stream editor required to have a high precision for commercial use or the like, the user can perform editing without a time lag between a picture and the corresponding audio.

According to a fourteenth aspect of the present invention, there is provided a compressively coded data reproduction apparatus for starting transmission of reproduced data from a picture and an audio frame corresponding to a reproduction start time specified from the outside, on a data stream in which coded video data arranged in non-chronological order, coded audio data relating to the coded video data, and additional data attendant on these data are multiplexed, and this apparatus comprises: a system decoder for separating the coded video data, the coded audio data, and the additional data from the data stream and outputting these data and, at this time, performing head detection on reproduced pictures and reproduced audio data; a video decoder for decoding pictures per screen from the coded video data; an audio decoder for decoding audio data from the coded-audio data; and a synchronous controller for judging whether the detected head picture per screen or head audio data is a picture per screen or audio data corresponding to the reproduction start time specified from the outside, on the basis of reproduction time information that is one of the additional data assigned to the picture per screen or the audio data detected by the system decoder; outputting a decoding request for decoding the picture per screen and the audio data corresponding to the reproduction start time, to the video decoder and the audio decoder; and outputting an output request to the video decoder and the audio decoder at the point of time when both of the picture per screen and the audio data have been decoded. Therefore, it is possible to detect a video frame and an audio frame corresponding to the specified reproduction start time, decode these frames, and output the decoded video and audio frames at the same timing. Accordingly, when this apparatus is applied to a stream editor required to have a high precision for commercial use or the like, the user can perform editing without a time lag between a picture and the corresponding audio.

DETAILED DESCRIPTION OF THE PREFERRED EMBODIMENTS

[Embodiment 1]

Figure 1:
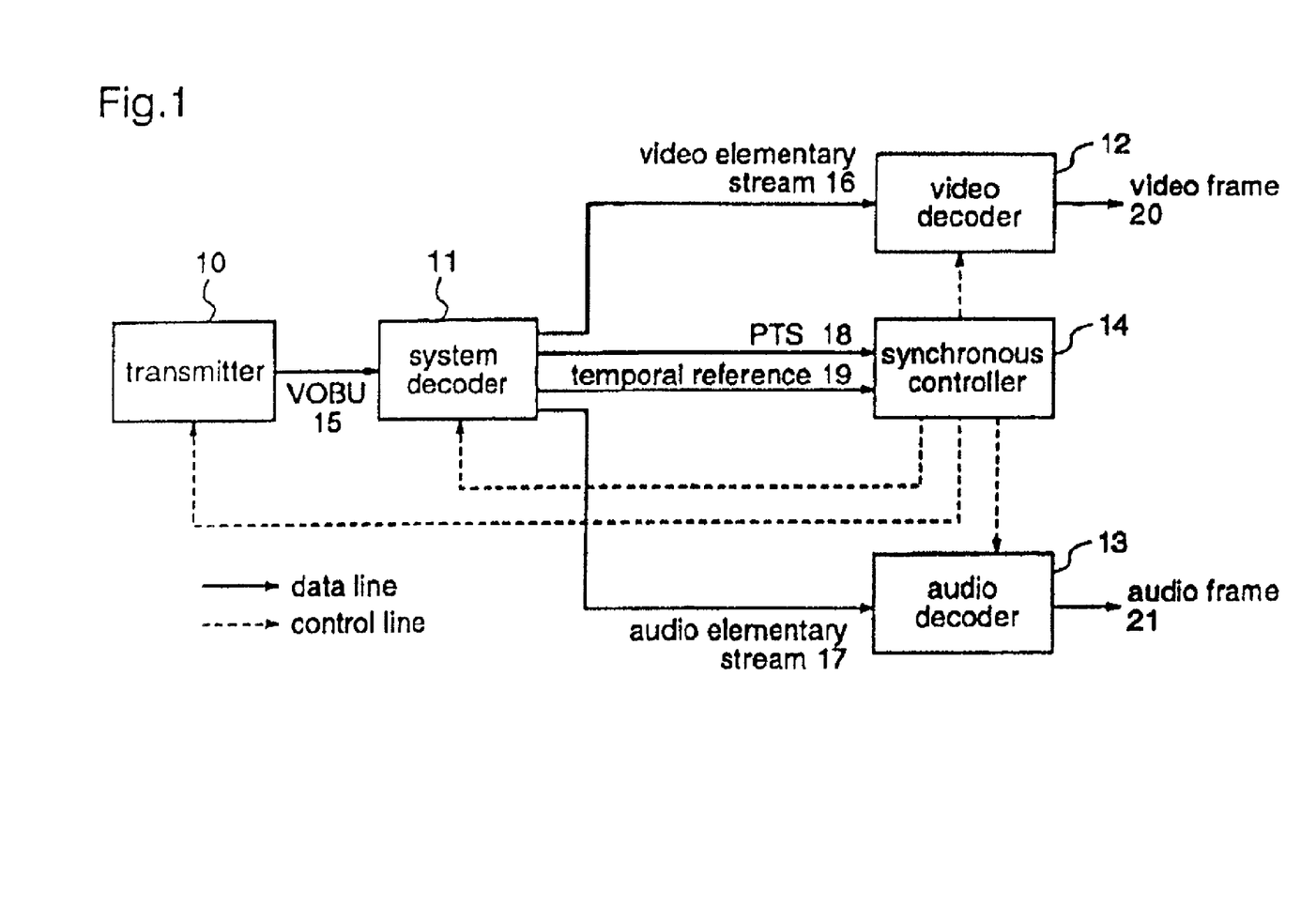
FIG. 1 is a block diagram illustrating the construction of a compressively coded data reproduction apparatus according to a first embodiment of the present invention.

FIG. 1 is a block diagram illustrating the construction of a compressively coded data reproduction apparatus according to a first embodiment of the present invention. With reference to FIG. 1, the compressively coded data reproduction apparatus is identical to the conventional apparatus shown in FIG. 7 in that it is provided with a transmitter 10 for transmitting a stream; a system decoder 11 for extracting a required pack from the inputted stream; a video decoder 12 for decoding video data; an audio decoder 13 for decoding audio data; and a synchronous controller 14 for controlling the operation timings of the respective constituents of the apparatus. In contrast with the conventional apparatus, the apparatus of the first embodiment is characterized by that the system decoder 11 supplies a temporal reference defined by the MPEG standard, as display output order information, to the synchronous controller 14.

Hereinafter, a description will be given of the operation of the compressively coded data reproduction apparatus according to the first embodiment, when it starts data reproduction according to an entry point.

First of all, a VOBU 15 including an entry point is transmitted from the transmitter 10 to the system decoder 11. The system decoder 11 extracts a video pack and an audio pack from the inputted VOBU 15, and transmits a video elementary stream 16 and an audio elementary stream 17, which are obtained by removing packet start codes and parameter data from the video pack and the audio pack, to the video decoder 12 and the audio decoder 13, respectively, and transmits a PTS 18 and a temporal reference 19, which are included in the parameter data, to the synchronous controller 14.

Further, the system decoder 11 performs detection of head frames of compressively coded video frames and audio frames when transmitting the video elementary stream 16 and the audio elementary stream 17 which are obtained by removing the packet start codes and the parameter data from the video pack and the audio pack extracted from the inputted VOBU 15, to the video decoder 12 and the audio decoder 13, respectively. When the system decoder 11 detects the head frames, it notifies the synchronous controller 14 of the result of the detection.

The video decoder 12 decodes video frames from the inputted video elementary stream 16. The audio decoder 13 decodes audio frames from the inputted audio elementary stream 17. The synchronous controller 14 controls the transmitter 10, the system decoder 11, the video decoder 12, and the audio decoder 13, thereby controlling synchronous output of a video frame 20 and an audio frame 21.

Figure 2:
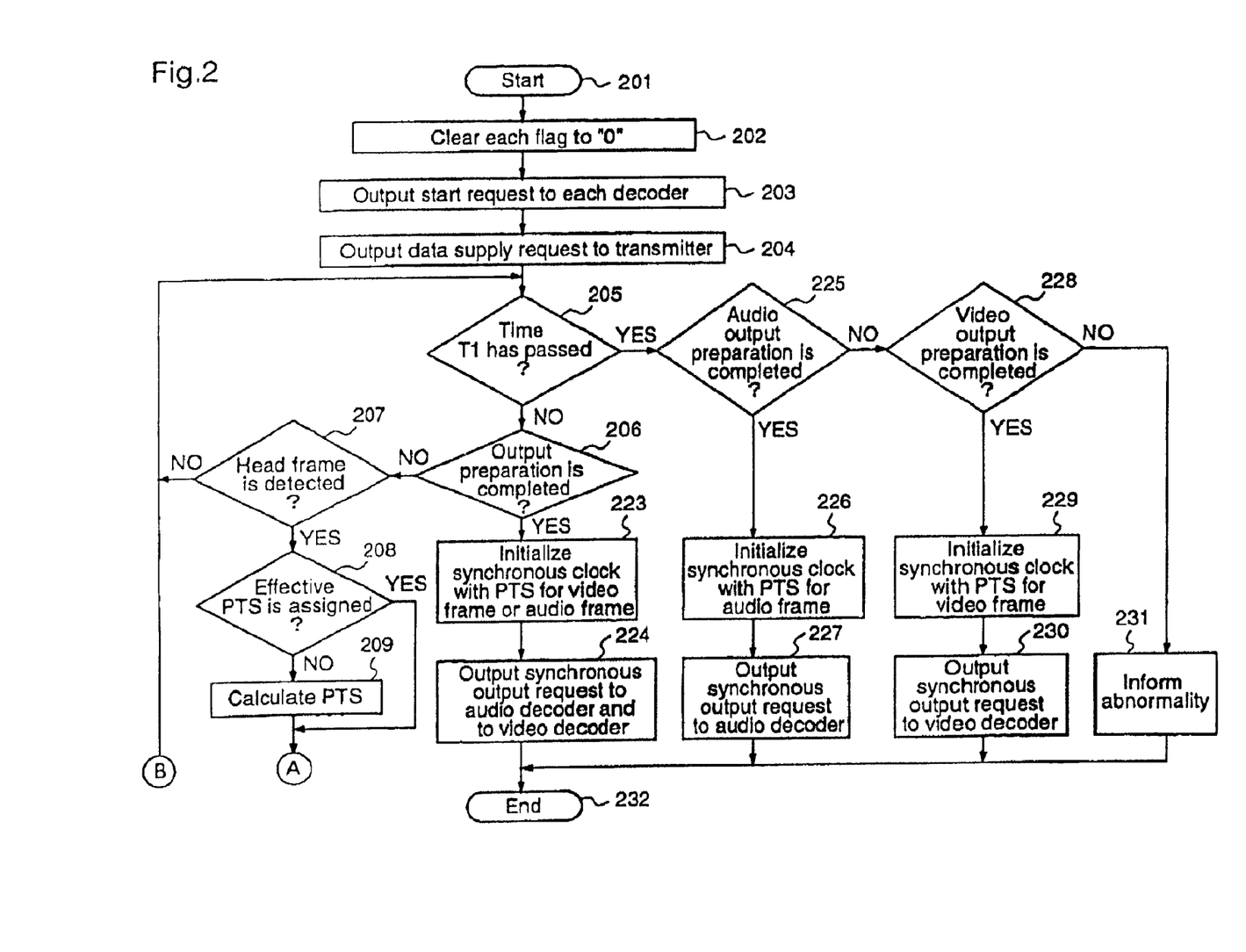
FIG. 2 is a diagram illustrating a part of a flowchart for explaining the operation of a synchronous controller as one of constituents of the compressively coded data reproduction apparatus of the first embodiment.
Figure 3:
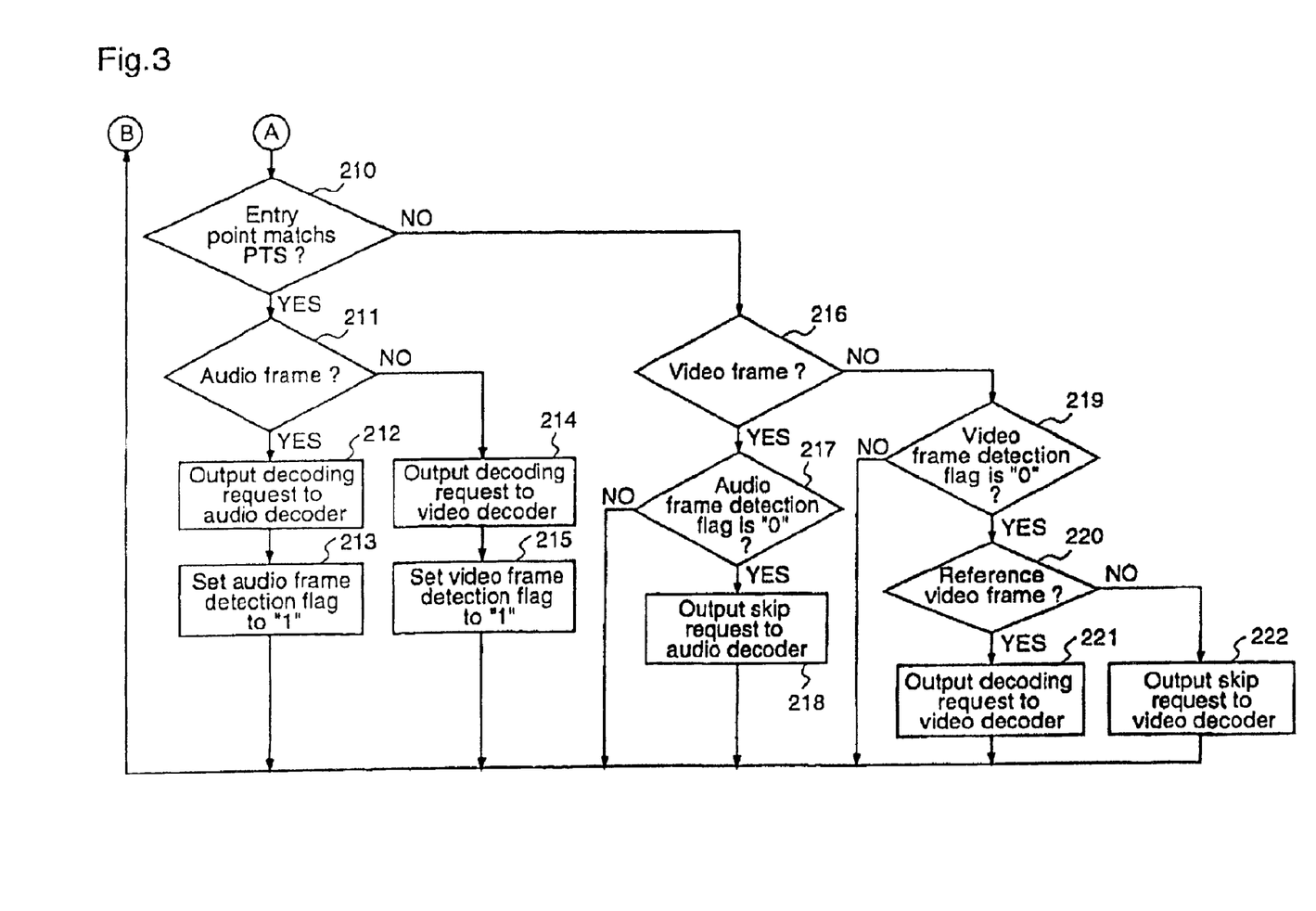
FIG. 3 is a diagram illustrating the remainder of the flowchart.

FIGS. 2 and 3 are flowcharts for explaining the operation of the synchronous controller 14 to start data reproduction by the entry point, according to the first embodiment. Hereinafter, the operation of the synchronous controller 14 will be described in detail with reference to the flowcharts of FIGS. 2 and 3.

Initially, when processing is started (step 201), the synchronous controller 14 is notified, from the outside, that an entry point value and an abnormality judgement time T1 are set and data reproduction is to be started from the entry point, and clears the following flags to "0": an audio frame output preparation end flag, a video frame output preparation end flag, an audio frame detection flag, and a video frame detection flag (step 202).

In step 203, the synchronous controller 14 outputs a start request to the transmitter 10 and to the respective decoders 11, 12, and 13. On receipt of this request, the transmitter 10 and the decoders 11, 12, and 13 start to operate.

In step 204, the synchronous controller 14 outputs a data supply request to the transmitter 10. On receipt of this request, the transmitter 10 performs data transmission, starting from the head of the VOBU including the entry point. On receipt of the data from the transmitter 10, the system decoder 11 starts the above-mentioned separation and extraction.

In step 205, the synchronous controller 14 judges whether the abnormality judgement time T1 has passed or not from when the reproduction start by the entry point was notified from the outside in step 202. When the abnormality judgement time T1 has not passed yet, the synchronous controller 14 proceeds to step 206. When the abnormality judgement time T1 has already passed, the synchronous controller 14 proceeds to step 225.

In step 206, the synchronous controller 14 judges whether both of the audio frame output preparation end flag and the video frame output preparation end flag are "1" or not. When both of these flags are not "1", the synchronous controller 14 proceeds to step 207. When both of these flags are "1", the controller 14 proceeds to step 223.

In step 207, the synchronous controller 14 judges whether the head of the compressively coded audio frames or video frames is detected or not. When the head audio or video frame is detected, the synchronous controller 14 proceeds to step 208. When no head frame is detected, the synchronous controller 14 returns to step 205.

In step 208, the synchronous controller 14 judges whether or not an effective PTS is assigned to the compressively coded frame detected in step 207. When no effective PTS is assigned to the detected frame, the synchronous controller 14 proceeds to step 209. When an effective PTS is assigned to the detected frame, the synchronous controller 14 proceeds to step 210.

In step 209, the synchronous controller 14 calculates a PTS of the frame detected in step 207 and having no effective PTS. When the frame detected in step 207 is an audio frame, the synchronous controller 14 calculates a PTS of the detected audio frame by adding a frame unit time corresponding to one audio frame to the PTS of the audio frame which has just previously been detected. When the frame detected in step 207 is a video frame, the synchronous controller 14 calculates a PTS (PTSn) of the detected video frame by using the following expression (1), on the basis of the PTS (PTSn−1) and the temporal reference (TRn−1) of the video frame which has just previously been detected, and the temporal reference (TRn) of the video frame detected in step 207.

$$PTSn = PTSn-1 + (TRn - TRn-1) \times [\text{one frame unit time of video frame}] \quad (1)$$

Next, in step 210, the synchronous controller 14 judges whether or not the frame detected in step 207 is a frame corresponding to the entry point that is set from the outside in step 202. When the frame detected in step 207 is judged as the frame corresponding to the entry point, the synchronous controller 14 proceeds to step 211. When the frame detected in step 207 is not judged as the frame corresponding to the entry point, the controller 14 proceeds to step 216. As the condition of this judgement, the following expression (2) is used as an conditional expression. That is, when the conditional expression holds, the synchronous controller 14 judges that the frame detected in step 207 is a frame corresponding to the entry point that is set from the outside in step 202. In the conditional expression, EP is the entry point value that is set from the outside in step 202, Tfm is the frame unit time, and PTSn is the PTS of the frame detected in step 207. Further, when the frame detected in step 207 is an audio frame, Tfm is the frame unit time corresponding to one audio frame. When the frame detected in step 207 is a video frame, Tfm is the frame unit time corresponding to one video frame.

$$EP - 1/2 \times Tfm < PTSn \leq EP + 1/2 \times Tfm \quad (2)$$

Next, in step 211, the synchronous controller 14 judges whether the frame detected in step 207 is an audio frame or not. When it is an audio frame, the synchronous controller 14 proceeds to step 212. When the frame detected in step 207 is a video frame, the controller 14 proceeds to step 214.

In step 212, the synchronous controller 14 outputs a decoding request for the audio frame detected in step 207 to the audio decoder 13, and proceeds to step 213. On receipt of this decoding request from the synchronous controller 14, the audio decoder 13 decodes the audio frame detected in step 207, and sets the audio frame output preparation end flag at "1" after the decoding is completed.

In step 213, the synchronous controller 14 sets the audio frame detection flag at "1", and returns to step 205.

Further, in step 214, the synchronous controller 14 outputs a decoding request for the video frame detected in step 207 to the video decoder 12, and proceeds to step 215. On receipt of this decoding request from the synchronous controller 14, the video decoder 12 decodes the video frame detected in step 207, and sets the video frame output preparation end flag at "1" after the decoding is completed.

In step 215, the synchronous controller 14 sets the video frame detection flag at "1", and returns to step 205.

Further, in step 216, the synchronous controller 14 judges whether the frame detected on step 207 is an audio frame or not. When it is an audio frame, the synchronous controller 14 proceeds to step 217. When the frame detected in step 207 is a video frame, the controller 14 proceeds to step 219.

In step 217, the synchronous controller 14 judges whether the audio frame detection flag is "0" or not. When the audio frame detection flag is "0", the controller 14 proceeds to step 218. When the audio frame detection flag is not "0", the controller 14 returns to step 205.

In step 218, the synchronous controller 14 outputs a request for skipping the audio frame detected in step 207 to the audio decoder 13, and returns to step 205. On receipt of this skip request from the controller 14, the audio decoder 13 executes skipping of the audio frame detected in step 207. The skipping is to discard the data of the audio frame without decoding it.

Further, in step 219, the synchronous controller 14 judges whether the video frame detection flag is "0" or not. When the video frame detection flag is "0", the controller 14 proceeds to step 220. When the video frame detection flag is not "0", the controller 14 returns to step 205.

In step 220, the synchronous controller 14 judges whether the frame detected in step 207 is a reference video frame (i.e., I picture or P picture) or not. When the frame detected in step 207 is a reference video frame, the controller 14 proceeds to step 221. When the frame detected in step 207 is not a reference video frame, the controller 14 proceeds to step 222.

In step 221, the synchronous controller 14 outputs a request for decoding the video frame detected in step 207 to the video decoder 12, and returns to step 205. On receipt of this decoding request, the video decoder 12 decodes the video frame detected in step 207.

In step 222, the synchronous controller 14 outputs a request for skipping the video frame detected in step 207 to the video decoder 12, and returns to step 205. On receipt of this skip request from the synchronous controller 14, the video decoder 12 executes skipping of the video frame detected in step 207.

Further, in step 223, the synchronous controller 14 initializes the synchronous clock with the PTS value of the video frame which has been decoded by the video decoder 12 as the result of the decoding request outputted to the video decoder 12 in step 214, or with the PTS value of the audio frame which has been decoded by the audio decoder 13 as the result of the decoding request outputted to the audio decoder 13 in step 212. After the process of starting data reproduction according to the entry point is ended (step 232), the synchronous controller controls reproduction of the compressively coded data by using the synchronous clock so that the audio frames and video frames are synchronously output.

Next, in step 224, the synchronous controller 14 outputs requests for outputting video frames and audio frames to the video decoder 12 and the audio decoder 13, respectively, and ends the process of starting data reproduction according to the entry point.

The video decoder 12 performs display output (i.e., output of data to be displayed) of the video frame which has been decoded as the result of the decoding request in step 214, and the audio decoder 13 performs audio output of the audio frame which has been decoded as the result of the decoding request in step 212.

Further, in step 225, the synchronous controller 14 judges whether the audio frame output preparation end flag is "1" or not. When the audio frame output preparation end flag is "1", the controller 14 proceeds to step 226. When this flag is not "1", the controller 14 proceeds to step 228.

In step 226, the synchronous controller 14 initializes the synchronous clock with the PTS value of the audio frame which has been decoded by the audio decoder 13 as the result of decoding request outputted to the audio decoder in step 212. After the process of starting data reproduction according to the entry point is ended (step 232), the synchronous controller 14 controls reproduction of the compressively coded data by using the synchronous clock so that the audio frames and the video frames are synchronously output.

In step 227, the synchronous controller 14 outputs an audio frame output request to the audio decoder, and ends the process of starting data reproduction according to the entry point. The audio decoder 13 performs audio output of the audio frame which has been decoded as the result of the decoding request outputted in step 212.

Further, in step 228, the synchronous controller 14 judges whether the video frame output preparation end flag is "1" or not. When the video frame output preparation end flag is "1", the controller 14 proceeds to step 229. When this flag is not "1", the controller 14 proceeds to step 231.

In step 229, the synchronous controller 14 initializes the synchronous clock with the PTS value of the video frame which has been decoded by the video decoder 12 as the result of the decoding request outputted to the video decoder in step 214. After the process of starting data reproduction according to the entry point is ended (step 232), the synchronous controller 14 controls reproduction of the compressively coded data by using the synchronous clock so that the audio frames and the video frames are synchronously output.

In step 230, the synchronous controller 14 outputs a video frame output request to the video decoder 12 to end the process of starting data reproduction according to the entry point. The video decoder 12 performs display output of the video frame which has been decoded as the result of the decoding requested outputted in step 214.

Further, in step 231, the synchronous controller 14 notifies the outside that an abnormal condition occurs.

As described above, the compressively coded data reproduction apparatus according to the first embodiment is able to detect a video frame and an audio frame corresponding to an entry point specified from the outside within a precision of video frame unit or audio frame unit by utilizing the temporal reference 19, decode the video and audio frames, and output the video and audio frames synchronously. Further, even when only either of a video frame and an audio frame corresponding to the entry point exists in the inputted VOBU, the apparatus can start data reproduction from the entry point normally. Further, even when both of a video frame and an audio frame corresponding to the entry point are not exist in the inputted VOBU, the apparatus can end the process of starting data reproduction from the entry point, without a standstill. Accordingly, the compressively coded data reproduction apparatus of the present invention is able to detect a video frame and an audio frame corresponding to a specified reproduction start time, decode the video and audio frames, and output the decoded video and audio frames at the same timing.

Further, since the video frame and the audio frame corresponding to the reproduction start time are output synchronously after confirming that each frame has been decoded in frame unit. Therefore, when this apparatus is applied to a stream editor that is required to have a high precision for commercial use or the like, the user can perform editing without a time lag between a picture and the corresponding audio.

While in the first embodiment the compressively coded data are processed in frame units, the data may be processed in screen units. For example, even when the data are processed in field units, the same effects as mentioned above are achieved.

What is claimed is:

1. A compressively coded data reproduction method for starting transmission of reproduced data from a video frame and an audio frame corresponding to a reproduction start time specified from the outside, on a data stream in which the following data are multiplexed: compressively coded video data comprising I pictures obtained by subjecting a series of video frames to intra-frame compressive coding, P pictures each obtained by forward-direction predictive compressive coding utilizing the correlation with a video frame in the past, and B pictures each obtained by bi-directional predictive compressive coding utilizing the correlation with two video frames in the past or in the future, or two video frames one in the past and one in the future; compressively coded audio data obtained by subjecting a series of audio frames to compressive coding; and additional data relating to the compressively coded video data and the compressively coded audio data, said method comprising:

separating the compressively coded video data, compressively coded audio data, and additional data from the data stream and outputting the separated data, and simultaneously performing head detection on the video frames and the audio frames;

judging whether a detected head frame is a video frame or an audio frame corresponding to the reproduction start time, on the basis of reproduction time information that is one of additional data assigned to the detected frame;

making a decoding request for decoding the detected video frame from the compressively coded vide data when the detected video frame is judged to be a video frame corresponding to the reproduction start time, and making a decoding request for decoding the detected audio frame from the compressively coded audio data when the detected audio frame is judged to be an audio frame corresponding to the reproduction start time;

judging whether both of the video frame and the audio frame have been decoded or not;

requesting synchronous output of the decoded video data and audio data when it is judged that both of the video frame and the audio frame have been decoded;

wherein performing head detection on the video frames and the audio frames comprises:

judging whether an effective reproduction time information is assigned to the detected head frame or not; and calculating reproduction time information of the video frame on the basis of display output order information that is one of the additional data of the video frame, and reproduction time information and display output order information of a video frame which has been decoded prior to the video frame, in the case where no effective reproduction time information is assigned to the detected frame, when the detected frame is a video frame, and alternatively calculating reproduction time information of the audio frame on the basis of reproduction time information of an audio frame which has been detected prior to the audio frame when the detected frame is an audio frame.

2. The compressively coded data reproduction method of claim 1, further comprising judging whether a predetermined period of time has passed or not, before judging whether both of the video frame and the audio frame have been decoded or not;

wherein, when the predetermined period of time has passed, an output request is made for either the video frame or the audio frame, whichever has been decoded.

3. The compressively coded data reproduction method of claim 1, further comprising:

judging whether a predetermined period of time has passed or not, before judging whether both of the video frame and the audio frame have been decoded or not; and notifying an outside recipient that an abnormal condition occurs, when the predetermined period of time has passed and then both of the video frame and the audio frame have not yet been decoded.

4. The compressively coded data reproduction method of claim 1, wherein the data stream is a program stream defined by the MPEG standard, and the reproduction time information is a PTS (Presentation Time Stamp) defined by the MPEG standard.

5. The compressively coded data reproduction method of claim 1, wherein the display output order information is a temporal reference defined by the MPEG standard.

6. The compressively coded data reproduction method for starting transmission of reproduced data from a picture and an audio frame corresponding to a reproduction start time specified from the outside, on a data stream in which coded video data arranged in non-chronological order, coded audio data relating to the coded video data, and additional data attendant on these data are multiplexed, said method comprising:

separating the coded video data, the coded audio data, and the additional data from the data stream and outputting the separated data and, at this time, performing head detection on reproduced pictures and reproduced audio data;

judging whether the detected head picture per screen or head audio data is a picture per screen or audio data corresponding to the reproduction start time specified from the outside, on the basis of reproduction time information that is one of the additional data assigned to the detected picture or audio data;

making a decoding request for decoding the picture per screen and the audio data corresponding to the reproduction start time;

judging whether both of the picture per screen and the audio data have been decoded or not; and making a request for synchronous output of the decoded picture per screen and the decoded audio data, when both of the picture and the audio data have already been decoded, wherein performing head detection on the reproduced pictures and the reproduced audio data comprises:

judging whether an effective reproduction time information is assigned to the detected picture or a audio data or not; and calculating reproduction time information of the picture per screen on the basis of display output order information that is one of the additional data of the picture per screen, and reproduction time information and display output order information of a picture per screen which has been decoded prior to the picture per screen, in the case where no effective reproduction time information is assigned to the detected picture or audio data when the detected picture or audio data is a picture per screen; and alternatively, calculating reproduction time information of the audio data on the basis of reproduction time information of an audio data which has been detected prior to the audio data when the detected picture or audio data is an audio data.

7. The compressively coded data reproduction method of claim 6, wherein the display output order information is a temporal reference defined by the MPEG standard.

8. A compressively coded data reproduction apparatus for starting transmission of reproduced data from a video frame and an audio frame corresponding to a reproduction start time specified from outside the apparatus, on a data stream in which the following data are multiplexed: compressively coded video data comprising I pictures obtained by subjecting a series of video frames to intra-frame compressive coding, P pictures each obtained by forward-direction predictive compressive coding utilizing the correlation with a video frame in the past, and B pictures each obtained by bi-directional predictive compressive coding utilizing the correlation with two video frames in the past or in the future or two video frames, one in the past and one in the future; compressively coded audio data obtained by subjecting a series of audio frames to compressive coding; and additional data relating to the compressively coded video data and the compressively coded audio data, said apparatus comprising:

a system decoder for separating compressively coded video data comprising video frames, compressively coded audio data comprising audio frames, and additional data from a data stream and outputting said separated data and, simultaneously performing head detection on such video frames and such audio frames;

a video decoder for decoding video frames from such compressively coded video data to output video data;

an audio decoder for decoding audio frames from compressively coded audio data to output audio data;

a synchronous controller for (1) judging whether a head frame detected by the system decoder is a video frame or an audio frame corresponding to a reproduction start time, on the basis of reproduction time information that is one of additional data assigned to the detected frame, (2) outputting a decoding request to the video decoder when a detected frame is judged as a video frame corresponding to the reproduction start time, (3) outputting a decoding request to the audio decoder when a detected frame is judged as an audio frame corresponding to such reproduction start time, and (4) outputting an output request to the video decoder and to the audio decoder at a point in time when both of a video frame and an audio frame have been decoded, wherein, when an effective reproduction time information is not assigned to the detected head picture per screen or head audio data detected by the system decoder, when detected picture or audio data is a picture per screen, the synchronous controller is for calculating reproduction time information of the picture per screen on the basis of display output order information that is one of additional data of the picture per screen, and reproduction time information and display output order information of a picture per screen which has been decoded prior to the picture per screen; and when the detected head picture per screen or head audio data is audio data, the synchronous controller is for calculating reproduction time information of audio data on the basis of reproduction time information of audio data which has been detected prior to such audio data.

9. The compressively coded data reproduction apparatus of claim 8, wherein, the synchronous controller is for outputting an output request to either of the video decoder and the audio decoder, depending on whichever has complete decoding at a specified point of time, when only either of a video frame and an audio frame has been decoded after expiration of a predetermined period of time.

10. The compressively coded data reproduction apparatus of claim 8, wherein, the synchronous controller is for notifying an outside recipient that an abnormal condition has occurred when both a video frame and an audio frame have not yet been decoded after expiration of a predetermined prior of time.

11. The compressively coded data reproduction apparatus of claim 8, wherein such data stream is a program stream defined by the MPEG standard, and such reproduction time information is a PTS (Presentation Time Stamp) defined by the MPEG standard.

12. The compressively coded data reproduction apparatus of claim 8, wherein the display output order information is a temporal reference defined by the MPEG standard.

13. The compressively coded data reproduction apparatus for starting transmission of reproduced data from a picture and an audio frame corresponding to a reproduction start time specified from outside the apparatus, on a data stream in which coded video data arranged in non-chronological order, coded audio data relating to such coded video data, and additional data attendant on such data are multiplexed, said apparatus comprising:

a system decoder for separating coded video data, coded audio data, and additional data from the data stream and outputting such separated data and, simultaneously performing head detection on reproduced pictures an reproduced audio data;

a video decoder for decoding pictures per screen from the coded video data;

an audio decoder for decoding audio data from coded audio data; and a synchronous controller for judging whether the detected head picture per screen or head audio data is a picture per screen or audio data corresponding to the reproduction start time specified from outside the apparatus, on the basis of reproduction time information that is one of additional data assigned to the picture per screen or the audio data detected by the system decoder; outputting a decoding request or decoding the picture per screen and the audio data corresponding to the reproduction start time, to the video decoder an the audio decoder; and outputting an output request to the video decoder and the audio decoder at a point of time when both of the picture per screen and the audio data have been decoded, wherein, when an effective reproduction time information is not assigned to the detected head picture per screen or head audio data detected by the system decoder, when picture or audio data is a picture per screen, the synchronous controller is for calculating reproduction time information of the picture per screen on the basis of display output order information that is one of additional data of the picture per screen, and reproduction time information and display output order information of a picture per screen which has been decoded prior to the picture per screen; and when the detected head picture per screen or head audio data is audio data, the synchronous controller is for calculating reproduction time information of such audio data, on the basis of reproduction time information of audio data which has been detected prior to such audio data.

14. The compressively coded data reproduction apparatus of claim 13, wherein such display output order information is a temporal reference defined by the MPEG standard.

* * * * *